July 20, 1937.    C. P. PARK    2,087,607
UNIT FRICTION FOR SHUTTLES
Filed Jan. 30, 1936    2 Sheets-Sheet 1
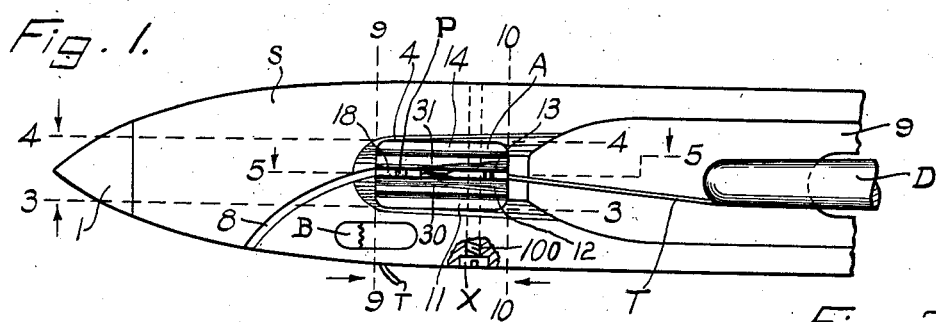
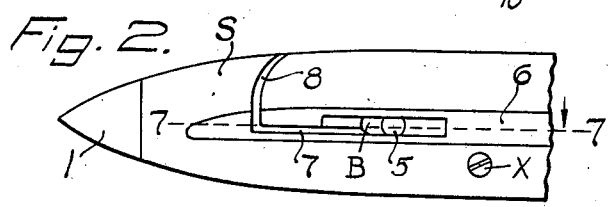
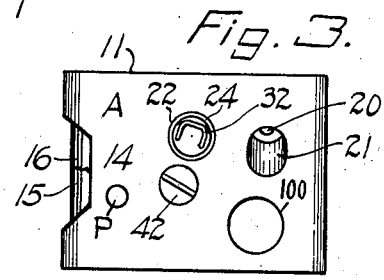
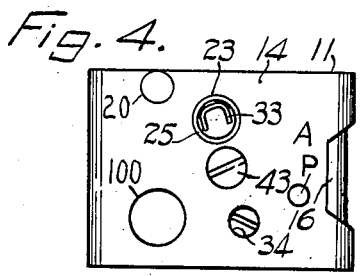
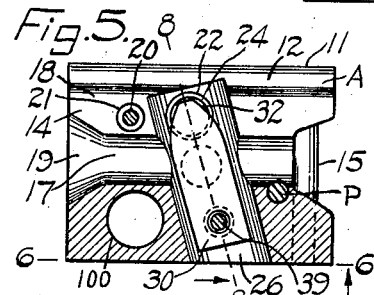
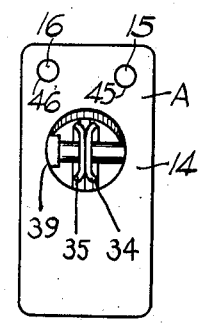
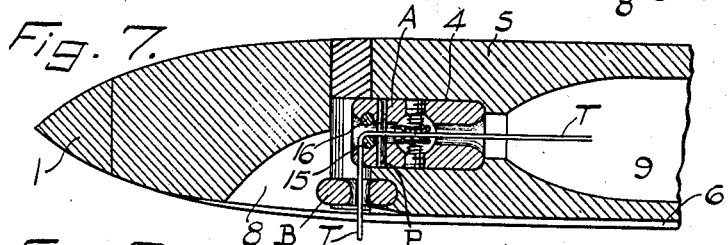
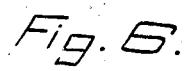
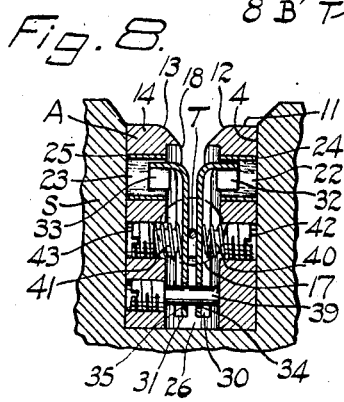
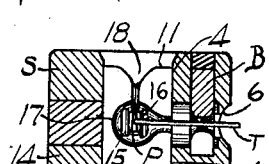
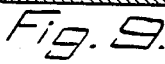
INVENTOR.
Carl Palmer Park
BY
Gardner W. Pearson
ATTORNEY.

July 20, 1937.  C. P. PARK  2,087,607
UNIT FRICTION FOR SHUTTLES
Filed Jan. 30, 1936   2 Sheets-Sheet 2
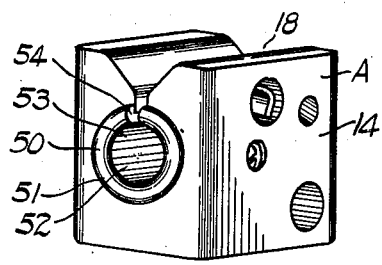
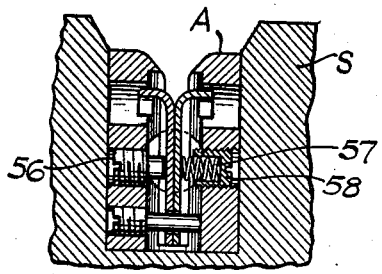
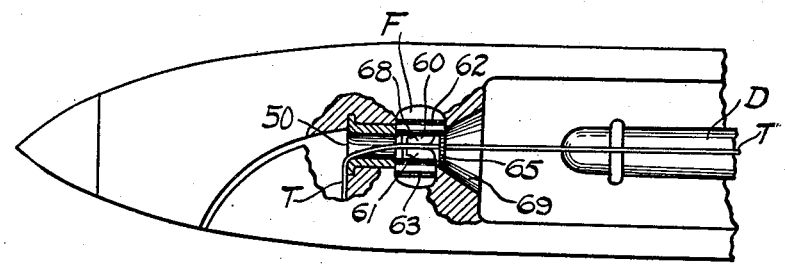
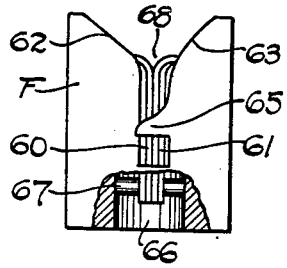
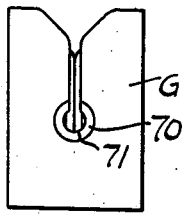
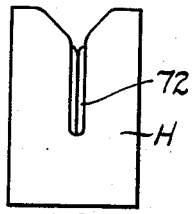
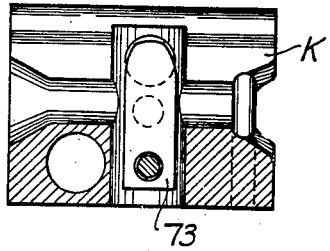
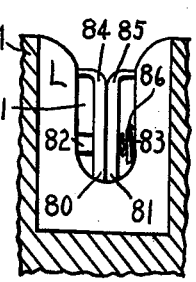
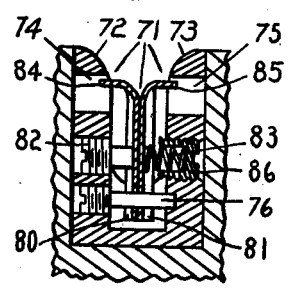
INVENTOR.
Carl Palmer Park
BY Gardner W. Pierson
ATTORNEY.

Patented July 20, 1937

2,087,607

UNITED STATES PATENT OFFICE 2,087,607

UNIT FRICTION FOR SHUTTLES

Carl Palmer Park, Manchester, N. H., assignor to U. S. Bobbin & Shuttle Company 1929, Providence, R. I., a corporation of Rhode Island Application January 30, 1936, Serial No. 61,554

10 Claims. (Cl. 139—217)

This invention relates to friction devices for shuttles, particularly those of the hand threading type.

Its principal characteristic is that it is all contained in a bodily transportable unit which can readily be put in place in a shuttle and can readily be removed for replacement or repairs.

The body of my unit has a longitudinal threading slot which extends from back to front and is of such form that when the device is inserted from the top into a suitable recess, this slot will register with the usual threading slot in the wood and become part of it. This threading slot is preferably expanded at the bottom into or is connected with a longitudinal whirling chamber which at the back is preferably expanded into a conical tunnel directly in front of the tip of the bobbin. The front part of the body is opposite the eye in the wood of the shuttle and is preferably provided with one or two pins or other suitable eye guides to deflect the thread from the threading slot out through the shuttle eye.

The parts of such a unit should be simple, cheap, easily made and of such character that they can be readily taken apart and put together and when put together they will not injure the thread by rubbing or breaking it, but will provide a drag or tension.

The device is preferably all metal and the friction plates, springs, screws, etc. are so arranged that while they can all be quickly taken out when the unit is removed from the shuttle, while the unit is in the shuttle, they cannot get out of place so as to damage the warp or allow the tension on the plates to be changed.

Moreover, as the friction plates, springs and screws in various shuttles can all be standardized and made the same, the tension on the thread in every shuttle can be so adjusted that it will be the same in all with the result that all the cloth in a cut which has been formed with different shuttles, will be the same. This is especially important in weaving rayon to prevent shiners by which is meant threads which, on account of rubbing somewhere, have a different luster from the other threads.

The adjoining faces of the friction plates are flat, except at the back and preferably at the front, and this helps to keep the tension uniform, to prevent shiners in rayon and to prevent snarling. Preferably also the friction plates are sloped from the top forward and down and there is a tooth or pin near the back which projects over and down into the threading slot to prevent unthreading or the throwing of loops which tend to kink, and must be unkinked, and which prevent rubbing against the various parts, thereby also causing shiners.

In the drawings, Fig. 1 is a plan view of the front part of a shuttle with my device in place.

Fig. 2 is a side elevation of the shuttle shown in Fig. 1.

Fig. 3 is a side elevation of the unit friction removed from the shuttle and viewed from the side of the shuttle eye.

Fig. 4 is an elevation of the unit friction from the side opposite of that shown in Fig. 3.

Fig. 5 is a vertical section on the line 5—5 of Fig. 1.

Fig. 6 is a bottom view of the unit friction removed from the shuttle.

Fig. 7 is a horizontal section on the line 7—7 of Fig. 2.

Fig. 8 is a vertical section on the line 8—8 of Fig. 5.

Fig. 9 is a section on the line 9—9 of Fig. 1.

Fig. 10 is a vertical section on the line 10—10 of Fig. 1.

Fig. 11 is an isometric view of a slightly modified form of the unit friction removed from the shuttle.

Fig. 12 is a view similar to Fig. 8 of a modified form of unit tension.

Fig. 13 is a view similar to Fig. 1 of a shuttle with a modified form of unit tension in place.

Fig. 14 is a back view of the unit tension shown in Fig. 13 removed from the shuttle.

Fig. 15 is a view similar to Fig. 14 of another modified form, and Fig. 16 is a view similar to Figs. 14 and 15 of still another modified form.

Fig. 17 is a view similar to Fig. 5 of another modification.

Fig. 18 is a view similar to Fig. 10 of another modification and Fig. 19 is a view similar to Fig. 12 of the modification shown in Fig. 18.

In the drawings, S represents a shuttle having the usual point 1 and bobbin chamber 9 in which is a bobbin D from which thread T is unwound and is threaded into the eye 5 in the wood through the straight and curved threading slot 8 and the connecting eye slot 7. 6 is the usual thread groove in the side and 4 is a recess extending down from the top in which the body 14 of my unit tension A is so located that its longitudinal threading slot 18 forms the straight part of the threading slot 8.

From the top 11 of unit A, the slot 18 extends downward and terminates in a longitudinal cylindrical whirling chamber 17 which spreads out at the back into a conical tunnel 19 to receive the thread T and to allow it to spin or balloon freely as it comes off the tip of the bobbin B.

The top of the slot 18 spreads out to form lips 12 and 13 to receive the thread and on one side is a tooth hole 21 into which extends the pointed part of a pin which forms a tooth 20. This pin is driven in and down diagonally so that while the thread can slip down over the tooth 20 and across the hole 21, it cannot readily get back and unthread.

Near the top on each side are two oppositely disposed nose guide holes 22 and 23 in which are preferably the annular removable bushings 24 and 25 to receive the nose parts 32 and 33 of the curved heads or tops of the oppositely disposed backwardly sloping vertical friction plates 30 and 31, which near their bottom, have guide pin holes 34 and 35 through which guide pin 39 passes loosely.

Plates 30 and 31 each preferably has a flat face in contact with the other and the holes 34 and 35 and guide pin 39 are preferably below and in front of holes 22 and 23, so that the friction plates slope from the top down and forward at an angle of from ninety-five to one hundred and ten degrees with respect to the general direction in which the thread passes through the whirling chamber or bottom part of the threading slot.

The unit A is held in place in shuttle S by a screw X which passes through a hole 100.

P is a supporting guide pin, preferably of porcelain or glass, to keep the thread up from the bottom of chamber 17.

B is an eye block for shuttles such as shown in my copending application filed October 30, 1935, Ser. No. 47,455.

Extending up from the bottom of body A and preferably sloping back is a plate hole 26 in which are located the friction plates 30 and 31 in which are holes through which the guide pin 39 passes. When disassembling, by removing pin 39, the guide plates 30 and 31 can easily be removed through plate hole 26 and can be replaced by new ones through the same hole.

Preferably behind each of the plates 30 and 31 is a compression spring such as 40 or 41 held in position and adjustable by means of an adjusting screw such as 42 or 43.

Preferably at each side of the front of slot 18 is an eye guide pin 15 or 16 which may be a porcelain, glass or hardened steel pin, preferably driven up from the bottom as through a hole such as 45 or 46.

However, as shown in Fig. 11, in place of the pins 15, 16 and also P, and serving as an eye guide, I can use a porcelain eyelet 50 which preferably has an enlarged head 51 and shank 52 through both of which is the hole 53 and through the top of both of which is a slot 54 which registers with the slot such as 18 in the unit.

As shown in Fig. 12, I can use on one side behind one friction plate, a stop such as 56 and have a compression spring 57 with adjusting screw 58 behind the other plate.

As shown in Figs. 13 and 14, instead of having a relatively long unit tension such as A, I can use a relatively short member F, with a slot 68 having lips 62 and 63 with friction plates 60 and 61 behind which are any suitable types of compression springs and I may make a tunnel such as 69 in the wood instead of in the metal.

In front of F, I may use an eyelet such as 50 to turn the thread at a right angle out through the shuttle eye and instead of the pin 20, I can form a sloping tooth at 65 which extends from one side across slot 68 back of the other side.

66 is a plate hole for assembling and taking apart, and 67 is a guide pin on which plates 60 and 61 are loosely mounted. The plates 60 and 61 are made with heads and noses similar to those of plates 30 and 31 which enter suitable guide holes, but their contacting friction faces are only slightly rounded at their back edges.

I may make my unit, as at G in Fig. 15, with a very small tunnel 70 at the end of a whirling hole 71 with no trapping tooth, or as at H in Fig. 16, I may omit the tooth and tunnel and merely use the bottom of the threading slot 72 for a whirling hole.

While I prefer to use a trapping tooth and to slope the plates forward and down to prevent or retard unthreading and to keep the thread down in line with the axis of the bobbin, I can omit the tooth and have the friction plates vertical as in a unit K, shown at 73, in Fig. 17.

While I prefer to use a plate hole at the bottom of the unit, up through which the plates can successively be put in position with the stop and spring and adjusting screw as well as the guide pin removed, as shown in Figs. 18 and 19, I can use a main body L, from the top of which the threading slot 71 extends downward. The top of slot 71 spreads out at 72 and 73 to form lips and has near the top, the nose guide holes 74 and 75. The guide pin 76 extends across the bottom of the threading slot and the friction plates 80 and 81 are loosely mounted thereon.

The outwardly curved heads of the friction plates 80, 81 with their noses 84 and 85 are considerably shorter than the width of slot 71 so that each one can be dropped down from the top instead of being pushed up from the bottom and can then be held in place by the pin 76, adjustable screw stop 82, compression spring 83 and adjusting screw 86.

Where a compression spring is used behind each plate, one of them may be regarded as a stop. In any construction, the stop and spring keep the plates in position after the unit is assembled.

I claim:

1. A unit tension for shuttles including a body from the top of which a longitudinal threading slot extends downward and terminates in a longitudinal whirling chamber, the back of which whirling chamber is expanded to form a conical tunnel, the top of the slot spreading out to form thread receiving lips, a plate hole which extends up from the bottom across the whirling chamber into the threading slot and up to proximate the lips, said hole sloping up and back, there being near the top of the plate hole two nose guide holes one on each side of the slot, each hole having a removable annular bushing, and a downwardly sloping tooth which extends across the back of the slot into a tooth hole; a guide pin which extends across the bottom of the plate hole below the threading slot; an eye guide at the front of the whirling hole at the front and bottom of the threading slot; two friction plates positioned in the plate hole and extending up through the slot, each plate near its foot being loosely mounted on the guide pin and each having an outwardly curved head with a nose of less length than the diameter of the plate hole which loosely enters a nose guide hole, each plate being flat where it comes in contact with the other and at its front and back edges being curved away from the other plate; together with compression springs behind each plate between the nose guide holes and the guide pin; and adjusting screws for adjusting the tension of each compression spring.

2. A unit tension for shuttles including a body from the top of which a longitudinal threading slot extends downward and terminates in a longitudinal whirling chamber, the back of which whirling chamber is expanded to form a conical tunnel, the top of the slot spreading out to form thread receiving lips, a plate hole which extends up from the bottom across the whirling chamber into the threading slot and up to proximate the lips, said hole sloping up and back, there being near the top of the plate hole two nose guide holes one on each side of the slot and a downwardly sloping tooth which extends across the back of the slot; a guide pin which extends across the bottom of the plate hole, an eye guide at the front and bottom of the threading slot; two friction plates positioned in the plate hole and extending up through the slot, each plate near its foot being loosely mounted on the guide pin and each having an outwardly curved head with a nose which loosely enters a nose guide hole, each plate being flat where it comes in contact with the other and at its front and back edges being curved away from the other plate; together with compression springs behind each plate between the nose guide holes and the guide pin; and adjusting screws for adjusting the tension of each compression spring.

3. A unit tension for shuttles including a body from the top of which a longitudinal threading slot extends downward, the top of the slot spreading out to form thread receiving lips, a plate hole which extends up from the bottom into the threading slot, said hole sloping up and back there being near the top of the plate hole two nose guide holes one on each side of the slot and a downwardly sloping tooth which extends across the back of the slot; a guide pin which extends across the bottom of the plate hole; an eye guide at the front and bottom of the threading slot; two friction plates positioned in the plate hole and extending up through the slot, each plate near its foot being loosely mounted on the guide pin and each having an outwardly curved head with a nose which loosely enters a nose guide hole, each plate being flat where it comes in contact with the other and at its front and back edges being curved away from the other plate; together with compression springs behind each plate between the nose guide holes and the guide pin; and adjusting screws for adjusting the tension of each compression spring.

4. A unit tension for shuttles including a body from the top of which a longitudinal threading slot extends downward, the top of the slot spreading out to form thread receiving lips, a plate hole which extends up from the bottom into the threading slot, said hole sloping up and back there being near the top of the plate hole two nose guide holes one on each side of the slot; a guide pin which extends across the bottom of the plate hole; two friction plates positioned in the plate hole and extending up through the slot, each plate near its foot being loosely mounted on the guide pin and each having an outwardly curved head with a nose which loosely enters a nose guide hole, each plate being flat where it comes in contact with the other and at its back edge being curved away from the other plate; together with a compression spring behind one plate between the nose guide holes and the guide pin; and an adjusting screw for adjusting the tension of the compression spring.

5. A unit tension for shuttles including a body from the top of which a longitudinal threading slot extends downward, the top of the slot extending out to form thread receiving lips, there being near the top of the slot two nose guide holes, one on each side; a guide pin which extends across the bottom of the slot; two friction plates sloping from the top down and forward and forming an obtuse angle with respect to the general direction in which the thread passes through the threading chamber, each plate near its foot being loosely mounted on the guide pin and each having an outwardly curved head with a nose which loosely enters a nose guide hole; together with a compression spring positioned behind one plate.

6. The combination in a shuttle having a longitudinal threading slot, of a metal threading block including part of said threading slot, the top of the slot extending out to form thread receiving lips; of two friction plates, each having a flat face in contact with the other and being bent away at the top to form an open mouth cooperating with the thread receiving lips, said plates sloping from the top down and forward forming an obtuse angle with respect to the general direction in which the thread passes through the threading slot; and a compression spring positioned behind one of said plates.

7. The combination in a shuttle having a longitudinal threading slot; of two friction plates, each having a flat face in contact with the other and being bent away at the top to form an open mouth, said plates sloping from the top down and forward forming an obtuse angle with respect to the general direction in which the thread passes through the threading chamber; and a compression spring positioned behind one plate.

8. The combination in a shuttle having a longitudinal threading slot; of two friction plates, each having a face in contact with the other, said plates sloping from the top down and forward forming an obtuse angle with respect to the general direction in which the thread passes through the threading chamber; and a compression spring positioned behind one plate.

9. The combination in a shuttle having a longitudinal threading slot; of two friction plates, each having a flat face in contact with the other and being bent away at the top to form an open mouth, said plates sloping from the top down and outward forming an obtuse angle with respect to the general direction in which the thread passes through the threading chamber; and a compression spring positioned behind one plate.

10. The combination in a shuttle having a longitudinal threading slot; of two friction plates, each having a face in contact with the other, said plates sloping from the top down and outward forming an angle with respect to the general direction in which the thread passes through the threading chamber; and a compression spring positioned behind one plate.

CARL PALMER PARK.